US010051909B2

(12) United States Patent
Zhang

(10) Patent No.: US 10,051,909 B2
(45) Date of Patent: Aug. 21, 2018

(54) INTELLIGENT SAFETY HELMET WITH FRONT PLAY OF REARVIEW

(71) Applicant: Ming Zhang, Fo Shan (CN)

(72) Inventor: Ming Zhang, Fo Shan (CN)

(*) Notice: Subject to any disclaimer, the term of this patent is extended or adjusted under 35 U.S.C. 154(b) by 0 days.

(21) Appl. No.: 15/197,285

(22) Filed: Jun. 29, 2016

(65) Prior Publication Data
US 2017/0143068 A1   May 25, 2017

(30) Foreign Application Priority Data

Nov. 25, 2015   (CN) .......................... 2015 1 0826452

(51) Int. Cl.
| G09G 5/00 | (2006.01) |
| A42B 1/24 | (2006.01) |
| A42B 3/04 | (2006.01) |
| H04W 4/80 | (2018.01) |
| A42B 3/30 | (2006.01) |
| A63B 71/10 | (2006.01) |
| G06F 3/00 | (2006.01) |
| H04B 1/3827 | (2015.01) |

(Continued)

(52) U.S. Cl.
CPC ............ *A42B 3/0426* (2013.01); *A42B 3/042* (2013.01); *A42B 3/30* (2013.01); *A42B 3/306* (2013.01); *A63B 71/10* (2013.01); *G06F 3/005* (2013.01); *H04B 1/385* (2013.01); *H04N 5/2251* (2013.01); *H04N 5/2253* (2013.01); *H04N 5/23254* (2013.01); *H04N 5/23293* (2013.01); *H04N 5/247* (2013.01); *H04W 4/008* (2013.01); *H04W 4/80* (2018.02)

(58) Field of Classification Search
CPC ..... A42B 3/042; A42B 3/0406; A42B 3/0426; A42B 3/0446; A42B 3/046; A42B 3/0493; A42B 3/0433; A42B 3/221; A42B 3/28; A42B 3/286; A42B 3/30; A42B 3/303; A42B 3/306; A63B 71/10; G06F 3/005; H04N 5/2253; H04N 5/247
USPC .................................. 2/410, 422, 424; 345/8
See application file for complete search history.

(56) References Cited

U.S. PATENT DOCUMENTS

| 4,364,636 A | * | 12/1982 | Ellis ....................... A42B 3/042 2/6.2 |
| 5,189,512 A | * | 2/1993 | Cameron ............. G02B 27/017 345/8 |

(Continued)

FOREIGN PATENT DOCUMENTS

DE   10234333 A1 * 2/2004 ............. A42B 3/042

*Primary Examiner* — Jameson Collier
(74) *Attorney, Agent, or Firm* — Kwan & Olynick LLP

(57) ABSTRACT

An intelligent safety helmet with front play of rearview is provided. The helmet includes a helmet body and several ventilation holes designed on it. The helmet body is set in the back with a rearview camera electrically connected with the intelligent hardware set in its front. The intelligent hardware includes a removable main bracket installed on one side of the helmet body, and the main bracket is installed with an optoelectronic device and a front-facing camera in the front via a rocker arm module, so that the user can use the front-facing camera to take pictures and store them in the memory or activate the rearview camera and project the image onto the optoelectronic device for view of rear conditions by the user. The user can use a transmissive optical module set in front of the eyes to play the pictures taken by the back-facing camera.

1 Claim, 5 Drawing Sheets

(51) Int. Cl.
*H04N 5/225* (2006.01)
*H04N 5/247* (2006.01)
*H04W 4/00* (2018.01)
*H04N 5/232* (2006.01)

(56) References Cited

U.S. PATENT DOCUMENTS

| | | | | |
|---|---|---|---|---|
| 5,341,242 A * | 8/1994 | Gilboa | ............... | G02B 27/0172 359/365 |
| 6,249,386 B1 * | 6/2001 | Yona | ............... | A42B 3/042 2/414 |
| 6,691,325 B1 * | 2/2004 | Pelletier | ............... | A42B 3/0433 2/422 |
| 7,800,650 B1 * | 9/2010 | Prieto | ............... | G02B 27/017 345/8 |
| 8,982,471 B1 * | 3/2015 | Starner | ............... | G02B 5/30 359/13 |
| 9,247,779 B1 * | 2/2016 | Aloumanis | ............... | G08G 1/137 |
| 2003/0163827 A1 * | 8/2003 | Purpura | ............... | A42B 3/042 725/105 |
| 2007/0271687 A1 * | 11/2007 | Zhou | ............... | A42B 3/0426 2/410 |
| 2008/0239080 A1 * | 10/2008 | Moscato | ............... | A42B 3/0426 348/148 |
| 2009/0073330 A1 * | 3/2009 | Viala | ............... | G06Q 10/107 349/11 |
| 2010/0180364 A1 * | 7/2010 | Willey | ............... | A42B 3/042 2/422 |
| 2011/0289661 A1 * | 12/2011 | Hammond | ............... | A42B 3/0433 2/422 |
| 2012/0188083 A1 * | 7/2012 | Miller, II | ............... | A42B 3/046 340/573.1 |
| 2013/0033610 A1 * | 2/2013 | Osborn | ............... | H04N 5/2258 348/207.1 |
| 2013/0128046 A1 * | 5/2013 | Gindin | ............... | G07C 5/0891 348/148 |
| 2013/0188080 A1 * | 7/2013 | Olsson | ............... | G09G 5/00 348/333.01 |
| 2013/0215281 A1 * | 8/2013 | Hobby | ............... | G06F 3/005 348/207.1 |
| 2013/0249776 A1 * | 9/2013 | Olsson | ............... | G06F 1/163 345/8 |
| 2013/0305437 A1 * | 11/2013 | Weller | ............... | A42B 3/0406 2/422 |
| 2014/0043212 A1 * | 2/2014 | Park | ............... | G02B 27/017 345/8 |
| 2014/0043213 A1 * | 2/2014 | Park | ............... | G02B 27/0176 345/8 |
| 2014/0130241 A1 * | 5/2014 | Abdollahi | ............... | A42B 3/042 2/422 |
| 2014/0189937 A1 * | 7/2014 | Pietrzak | ............... | A42B 3/062 2/411 |
| 2014/0273863 A1 * | 9/2014 | Luizzi | ............... | H04M 1/05 455/66.1 |
| 2014/0320971 A1 * | 10/2014 | Gupta | ............... | G02B 5/02 359/630 |
| 2014/0362244 A1 * | 12/2014 | Martin | ............... | H04N 5/23241 348/211.2 |
| 2015/0130945 A1 * | 5/2015 | Yu | ............... | H04N 7/181 348/158 |
| 2015/0338659 A1 * | 11/2015 | Gallery | ............... | A42B 3/042 345/8 |
| 2016/0044276 A1 * | 2/2016 | Shearman | ............... | A42B 3/0426 348/207.1 |
| 2016/0085077 A1 * | 3/2016 | Milea | ............... | G02B 27/0149 359/632 |
| 2016/0091722 A1 * | 3/2016 | Liu | ............... | G02B 27/0172 345/8 |
| 2016/0110615 A1 * | 4/2016 | Weller | ............... | B60R 1/00 348/115 |
| 2017/0176746 A1 * | 6/2017 | Weller | ............... | G02B 27/0172 |
| 2017/0347735 A1 * | 12/2017 | Zhang | ............... | A42B 3/0426 |

* cited by examiner

INTELLIGENT SAFETY HELMET WITH FRONT PLAY OF REARVIEW

CROSS REFERENCE TO RELATED APPLICATION

This application takes priority from and claims the benefit of Chinese Patent Application No. CN201510826452.X filed on Nov. 25, 2015, the contents of which are herein incorporated by reference.

TECHNICAL FIELD

The present invention relates to a riding device, and, specifically, an intelligent safety helmet with front play of rearview.

BACKGROUND OF PRESENT INVENTION

With the improvement of living standards, people are paying increasingly closer attention to outdoor exercises, among which riding is a relatively fashionable one, as it both achieves physical and psychological exercise and gives the rider an opportunity to enjoy the landscape along the road. In their riding process, people like to stop their bicycle and take pictures of the beautiful landscape coming into their sight, and this inevitably means that they have to bring along cellphone, camera and other devices that can take pictures and that they have to bear these additional loads during their ride. Meanwhile, stopping the bicycle to take pictures means a significant waste of time in the journey, tightens the pre-defined schedule and causes delay and great inconvenience to the rider.

In addition, you may need your cellphone or talkback for a talk or communication during the riding process, but the current practice is that they are fixed on the handlebar and directly operated via the line control earphone. This practice causes some potential hazards, as the line control earphone needs a relatively long earphone line, the varying distance between the human body and the handlebar affects the scope of motion, and so forth.

Currently, the knowledge of the rider about an unfamiliar journey is basically obtained from the Internet, so the rider may not be very familiar with the specific route and road condition. In this case, the rider may be exposed to relatively major and unknown risks, especially when the riding takes place on narrow mountain roads. Furthermore, in the case of an emergency or an accident, the rider has no way but to use cellphone or other communication devices to seek rescue from companions. In that case, if there is no active communication available, the rescue time will be greatly delayed.

Lastly but not least importantly, the helmets currently on the market have not been provided with a rearview function; in some cases, they are designed with various functions, but these functions are mainly attached onto the helmet and are not removable, as a result of which the user may be unwilling to use these functions or are subject to the inconvenience caused by functional device failure.

SUMMARY OF INVENTION

The present invention aims to overcome the defects of existing technologies, and to provide an intelligent safety helmet with front play of rearview that is characterized by simple structure, convenient use, low production cost novel structural method.

The aim of the present invention is to be realized through the following approach: An intelligent safety helmet with front play of rearview which consists of the helmet body and several ventilation holes designed on it, wherein, the said helmet body is set in the back with a rearview camera electrically connected with the intelligent hardware set in its front, the said intelligent hardware consists of a removable main bracket installed on one side of the helmet body, and the main bracket is installed with an optoelectronic device and a front-facing camera in the front via a rocker arm module, so that the user can use the front-facing camera to take pictures and store them in the memory or activate the rearview camera and project the image onto the optoelectronic device for view of rear conditions by the user. The beneficial effect of the present invention lies in that, the user can use a transmissive optical module set in front of the eyes to play the pictures taken by the back-facing camera set in the back of the helmet, so that the user can know about the conditions behind the bicycle and ensure riding safety.

The said intelligent hardware also consists of a global positioning system (GPS) module, gyroscope, gravity sensor and acceleration sensor set inside the main bracket.

The said intelligent hardware also consists of a BLUETOOTH® module, microphone module and earphone module set on the main bracket, so that the user can realize communication through connecting the BLUETOOTH® module with the cellphone.

The said intelligent hardware also consists of the network communication module set inside the main bracket, so that Internet connection can be activated via 2G, 3G, 4G or WIFI network.

The said optoelectronic device is a transmissive optical module.

The beneficial effects of the present invention: 1 The present invention has the advantages of simple structure, convenient assembly, low production cost, strong market competitiveness, free assembly and disassembly, etc. 2 The user can use the transmissive optical module set in front of the eyes to play the pictures taken by the back-facing camera set in the back of the helmet, so that the user can know about the conditions behind the bicycle and ensure riding safety. 3 The user can also realize music play and cellphone communication via the BLUETOOTH® module, thus to make convenience for the user, avoid the inconvenience caused by traditional wired earphone, prevent the earphone line from distracting the user in the riding process, and so forth. 4 The multimedia module is designed with GPS navigation and other relevant functions, making convenience for the user to record exercise information.

BRIEF DESCRIPTION OF THE DRAWINGS

Depicted in FIG. 1, FIG. 2

Figure 1:
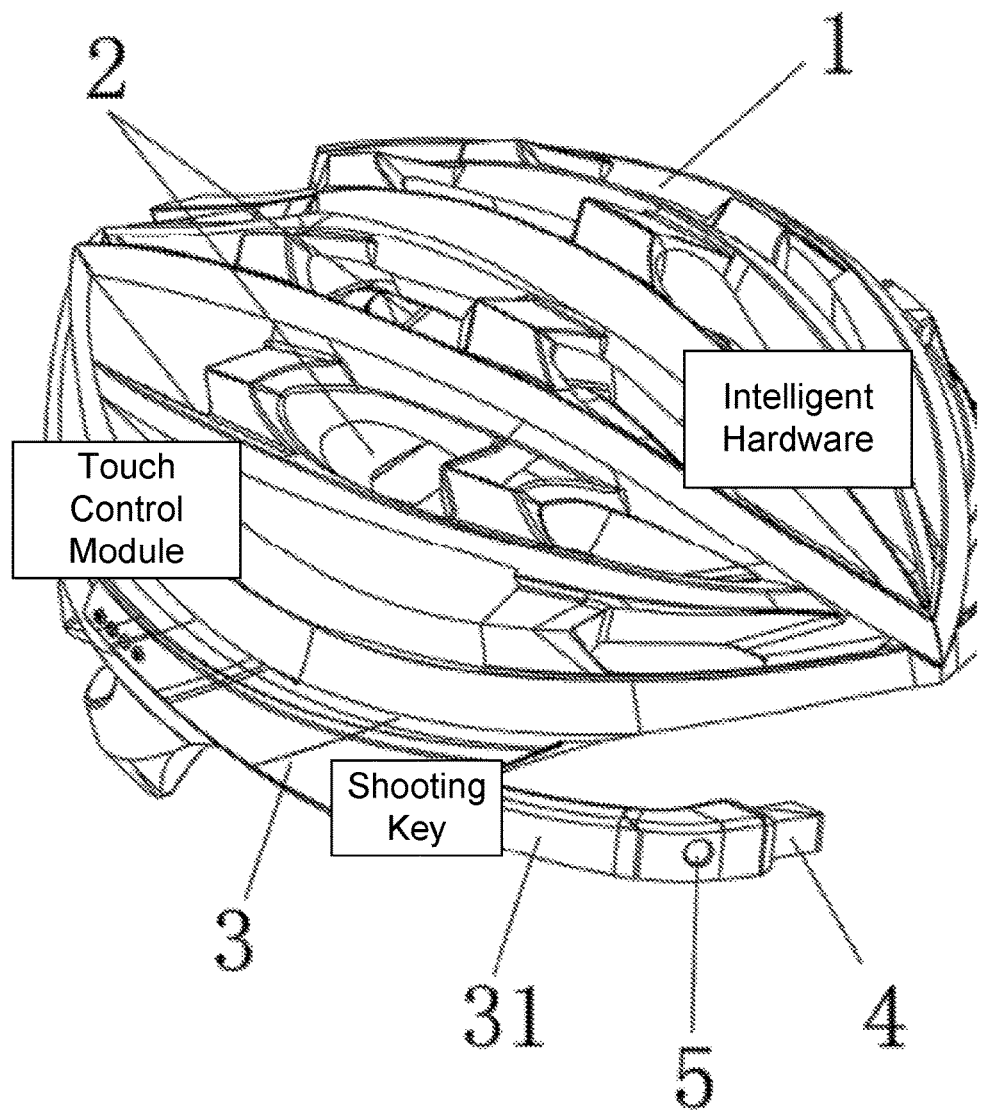
Figure 2:
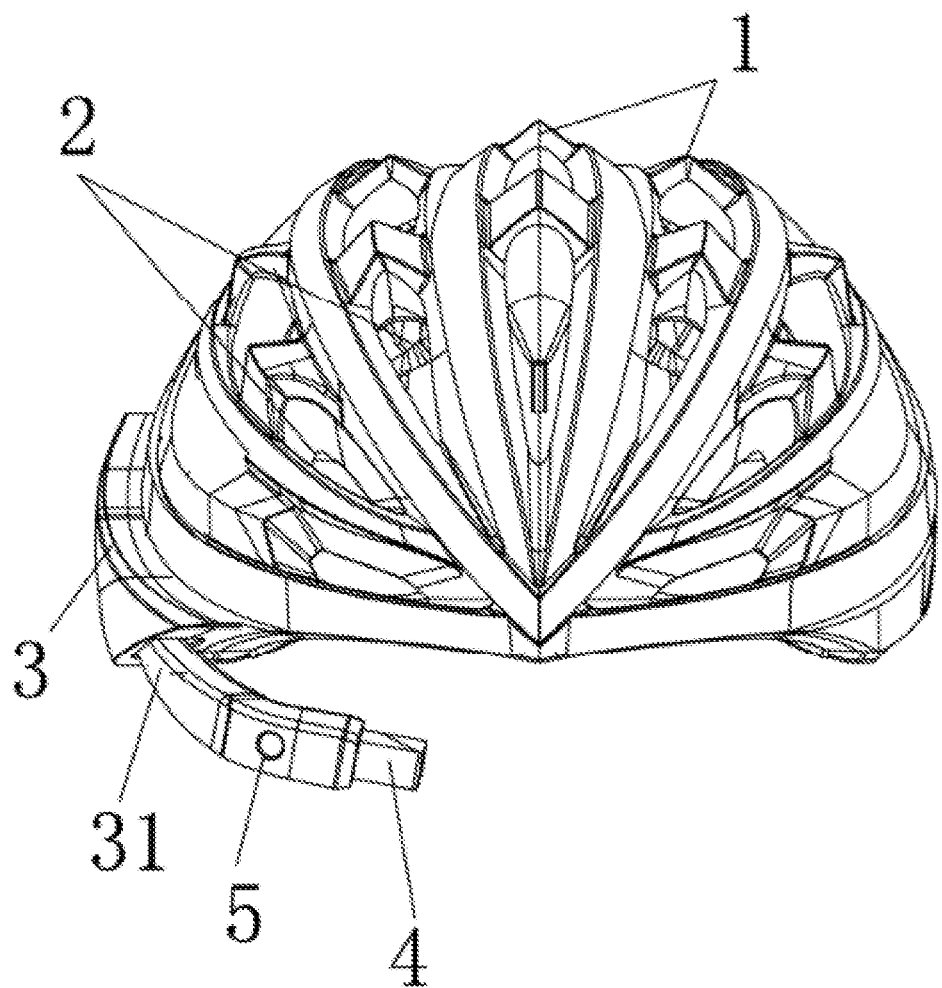
Figure 3:
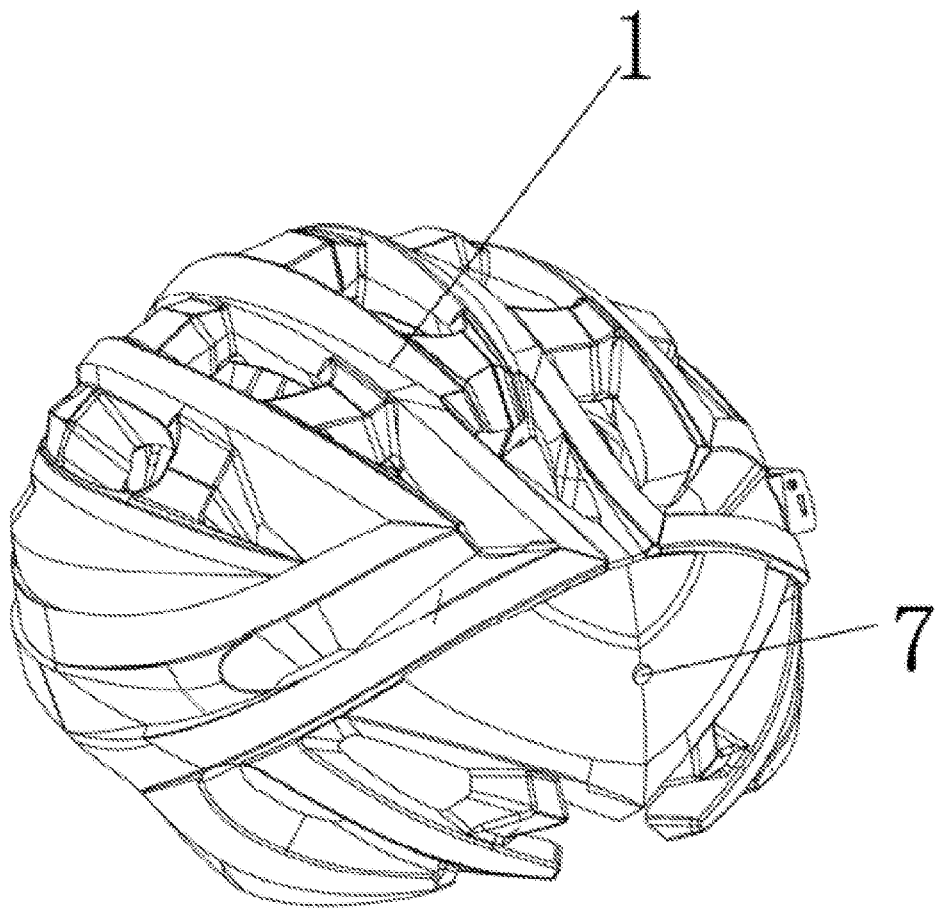
FIG. 3 is the general assembly effect diagram of the present invention.
Figure 4:
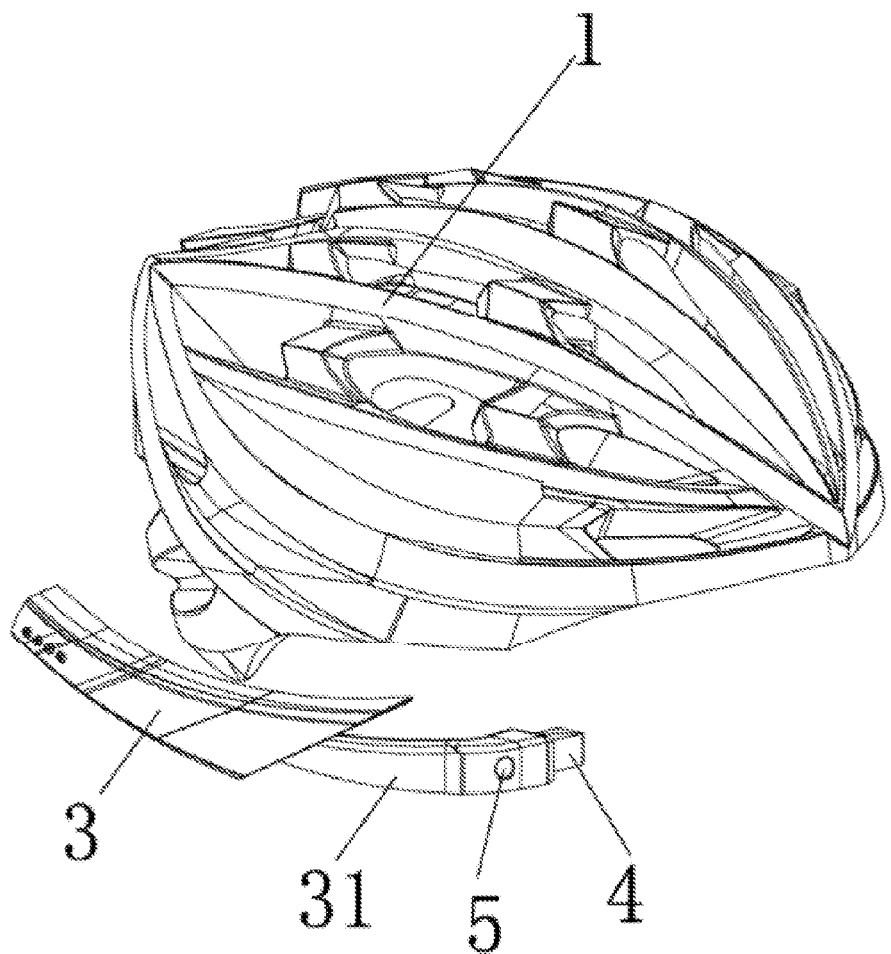

Depicted in FIG. 4 is the assembly drawing of the main bracket and helmet body of the present invention.

Figure 5:
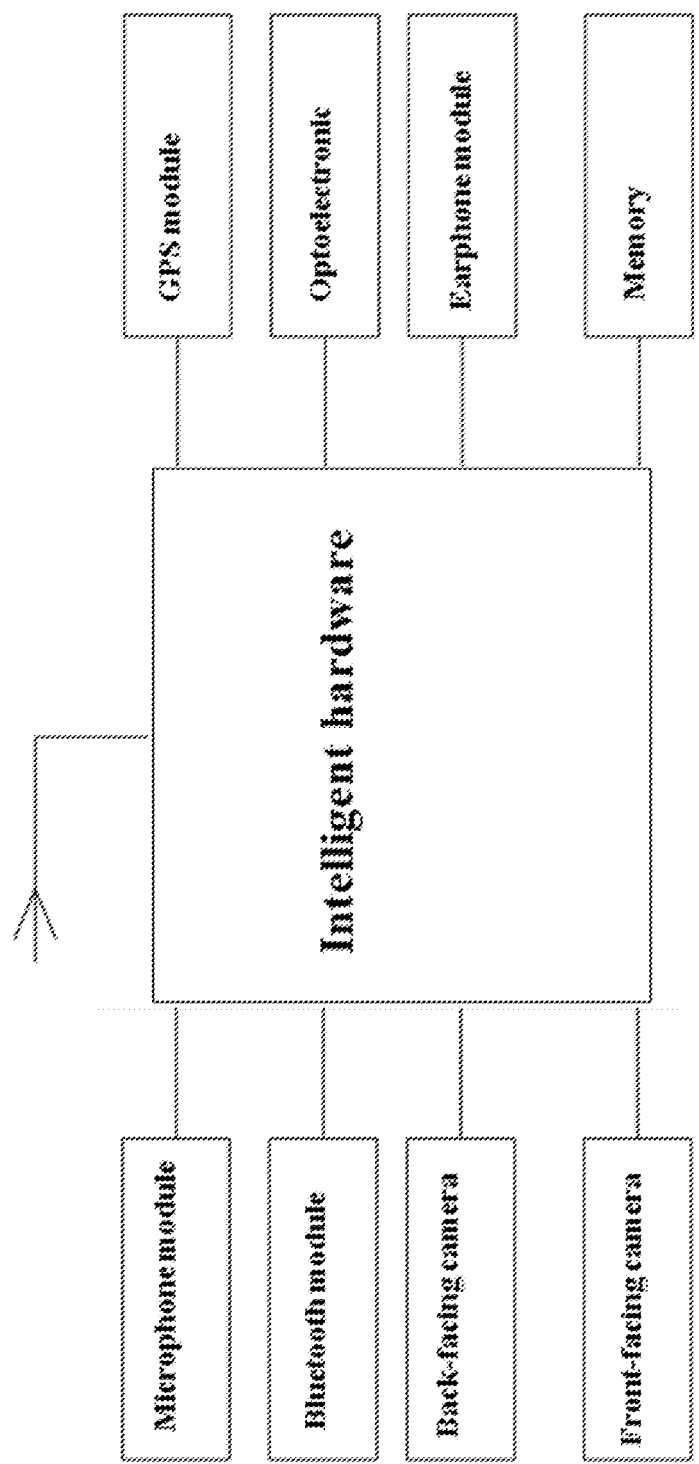

Depicted in FIG. 5 is the structural schematic diagram of the present invention.

DETAILED DESCRIPTION OF THE PREFERRED EMBODIMENT

Further specific explanations of the present invention are provided below in combination with the appended drawings. The present invention relates to an intelligent safety helmet with front play of rearview which consists of the helmet body 1 and several ventilation holes 2 designed on it, wherein, the said helmet body 1 is set in the back with a rearview camera 7 electrically connected with the intelligent hardware set in its front, the said intelligent hardware consists of a removable main bracket 3 installed on one side of the helmet body 1, and the main bracket 3 is installed with an optoelectronic device 4 and a front-facing camera 5 in the front via a rocker arm module 31, so that the user can use the front-facing camera 5 to take pictures and store them in the memory or activate the rearview camera and project the image onto the optoelectronic device 4 for view of rear conditions by the user. The rocker arm module 31 is in the form of an extending member. A longitudinal plane bisects the helmet body into a left half and a right half, wherein the longitudinal plane extends from a front end of the helmet to a rear end of the helmet. The front-facing camera 5 is directed affixed to the extending member and the removable main bracket 3 is entirely disposed within one of the left half or the right half of the helmet body.

The said intelligent hardware also consists of the GPS positioning module, gyroscope, gravity sensor and acceleration sensor set inside the main bracket 3.

The said intelligent hardware also consists of the BLUETOOTH® module, microphone module and earphone module set on the main bracket 3, so that the user can realize communication through connecting the BLUETOOTH® module with the cellphone.

The said intelligent hardware also consists of the network communication module set inside the main bracket 3, so that Internet connection can be activated via 2G, 3G, 4G or WIFI network.

The said optoelectronic device 4 is a transmissive optical module.

Working principle: Before using the helmet described in the present invention, the user may remove the intelligent hardware from the helmet body for charging, data copying and other operations. In actual use, it's only necessary to assemble the two together via connectors. When wanting to take a picture or a video during the riding process, the user first operates the touch control module to send the command, which is then received by the processor to activate the front-facing camera; after that, the user presses the shooting key to complete the command of taking a picture or a video. The pictures and videos taken are can be stored in the memory card or transmitted to the cellphone for storage via BLUETOOTH®; the specific operation methods can be correspondingly set by the user in the system. During the ride the rider needs to look behind from time to time to check out the road condition and ensure riding safety, however, bicycles have no rearview mirror, which means that the rider has to turn around for observation. This can be very dangerous for the rider. Thus, in the present invention, a camera is set in the back of the helmet, so that, when the user wants to observe the road condition behind the bicycle, he/she can send the command of activating the back-facing camera module to the processor via the APP. Upon receiving the command, the processor activates the back-facing camera, transmits the pictures and videos taken to the intelligent hardware via data lines and plays them with the transmissive optical module set in front of the eyes, so that the rider can know about the road conditions behind on a real-time basis and avoid safety accidents. In addition, when the transmissive optical module is playing the contents, the user can also check the road condition in the front via the screen, thus to avoid the blocking of eyesight by this module.

When the user is riding on an unfamiliar route, the GPS module can be used to determine the current riding position, feed it to the APP to calculate the fastest route to the destination, and send the route information to the processor via BLUETOOTH®; upon receiving the route information, the processor plays the information on the navigation interface via the transmissive optical module, so that the user knows exactly where to go. Meanwhile, in the riding process, the GPS module constantly updates the position of the rider and feeds it to the cellphone APP, thus to ensure the correct riding direction. Furthermore, the APP monitors the front road condition on a real-time basis, so that, in the case of road repair or traffic jam, it will send a notice via the intelligent hardware. The GPS module can also be electrically connected with the gyroscope, G-sensor, acceleration sensor and other modules for calculation based on GPS information; relevant technical information can also be generated in the system during the ride, so that the user can conveniently conduct a data analysis, timely know about his/her exercise amount and establish a more effective or healthy exercise plan based on these data.

To be specific, to enhance the functionality of this device, the intelligent hardware also consists of the network communication module set inside the main bracket 3, so that Internet connection can be activated via 2G, 3G, 4G or WIFI network. Thus, during the ride, the user can check the weather forecast, play music, videos and pictures downloaded from the Internet or stored in the memory and so forth, thus enjoying more entertaining functions.

In the case of the rider needing to make or answer a call during the ride, the intelligent hardware receives the signal via the BLUETOOTH® module, and conducts communication through the microphone and earphone modules, thus to realize the goal of wireless communication and avoids the trouble and potential safety hazards caused by the use of wired earphone under traditional technologies. Exactly by virtue of its integration of multiple functions in one helmet, the present invention not only makes convenience for use, but also can fully attract consumers with its novel structure and functions and can be widely promoted.

Displayed and described above are the basic principle, main characteristics and advantages of the present invention. It should not be difficult for technicians in the industry to understand that the present invention is not limited by the above example, that what is described in the above example and manual is only the principle of the present invention, and that, under the premise of not breaking away from the spirit or scope of the present invention, the present invention may have various variations and improvements (like the sectional shape of the guide rail, the material and structure of noise reduction gaskets, etc.), all of which shall fall within the scope of the present invention to be protected.

What is claimed:

1. An intelligent safety helmet for providing a rearview image in front of a user, the helmet consisting of:
   a helmet body including a plurality of ventilation holes provided in the helmet body, wherein a longitudinal plane bisects the helmet body into a left half and a right half, the longitudinal plane extending from a front end of the helmet to a rear end of the helmet;
   wherein the helmet further includes an intelligent hardware, a memory unit, and a rearview camera, wherein the intelligent hardware is included in a front portion of the helmet body, and wherein the rearview camera is electrically connected with the intelligent hardware;
   the intelligent hardware comprising a removable main bracket installed on one side of the helmet body, and wherein the removable main bracket includes an optoelectronic device, a front-facing camera, and an extending member;

wherein the front-facing camera is directly affixed to the extending member, the removable main bracket is entirely disposed within one of the left half or the right half of the helmet body, the helmet further comprises a touch control module mounted to the helmet body, wherein the front-facing camera is coupled to the touch control module, the touch control module being configured to be used to activate the front-facing camera, and wherein the front-facing camera is further coupled to a shooting key that, when pressed, is configured to capture pictures and store the pictures in the memory unit; and wherein the rearview camera is configured to be activated from an application on a device of the user and project the rearview image from the rearview camera onto the optoelectronic device upon activation.

\* \* \* \* \*